United States Patent [19]
Vogeley et al.

[11] Patent Number: 5,150,238
[45] Date of Patent: Sep. 22, 1992

[54] ACTIVE MATRIX LCD PROJECTION SYSTEM WITH ANTI-REFLECTIVE CHARACTERISTICS

[75] Inventors: James H. Vogeley, Yorktown; Patrick H. Newton, Hampton, both of Va.

[73] Assignee: nView Corporation, Newport News, Va.

[21] Appl. No.: 663,124

[22] Filed: Mar. 4, 1991

[51] Int. Cl.$^5$ .................. G02F 1/1335; G02F 1/1333
[52] U.S. Cl. .................................... 359/74; 359/40
[58] Field of Search .......................... 359/74, 40

[56] References Cited

U.S. PATENT DOCUMENTS

| | | | |
|---|---|---|---|
| 4,534,622 | 8/1985 | Harada et al. | 359/40 |
| 4,556,288 | 12/1985 | Sekimura | 359/74 |
| 5,056,895 | 10/1991 | Kahn | 359/74 |

FOREIGN PATENT DOCUMENTS

| | | | |
|---|---|---|---|
| 0076528 | 5/1982 | Japan | 359/74 |
| 0115914 | 6/1985 | Japan | 359/74 |
| 1428700 | 3/1976 | United Kingdom | 359/74 |

Primary Examiner—Stanley D. Miller
Assistant Examiner—Anita Pellman Gross
Attorney, Agent, or Firm—Nixon & Vanderhye

[57] ABSTRACT

The projection system includes a light source, a lens for focussing the light rays, an active matrix LCD panel disposed and spaced between a pair of glass panels and a lens and mirror system for projecting the LCD image onto an enlarged surface. To minimize, eliminate or attenuate ghosting of the images caused by secondary reflections from the upper glass panel back onto the LCD, the undersurface of the upper glass panel is coated with a high-efficient, anti-reflecting material, such as including magnesium fluoride, whereby high-contrast ratio images are maintained and not degraded by secondary reflections in the optical system.

8 Claims, 1 Drawing Sheet

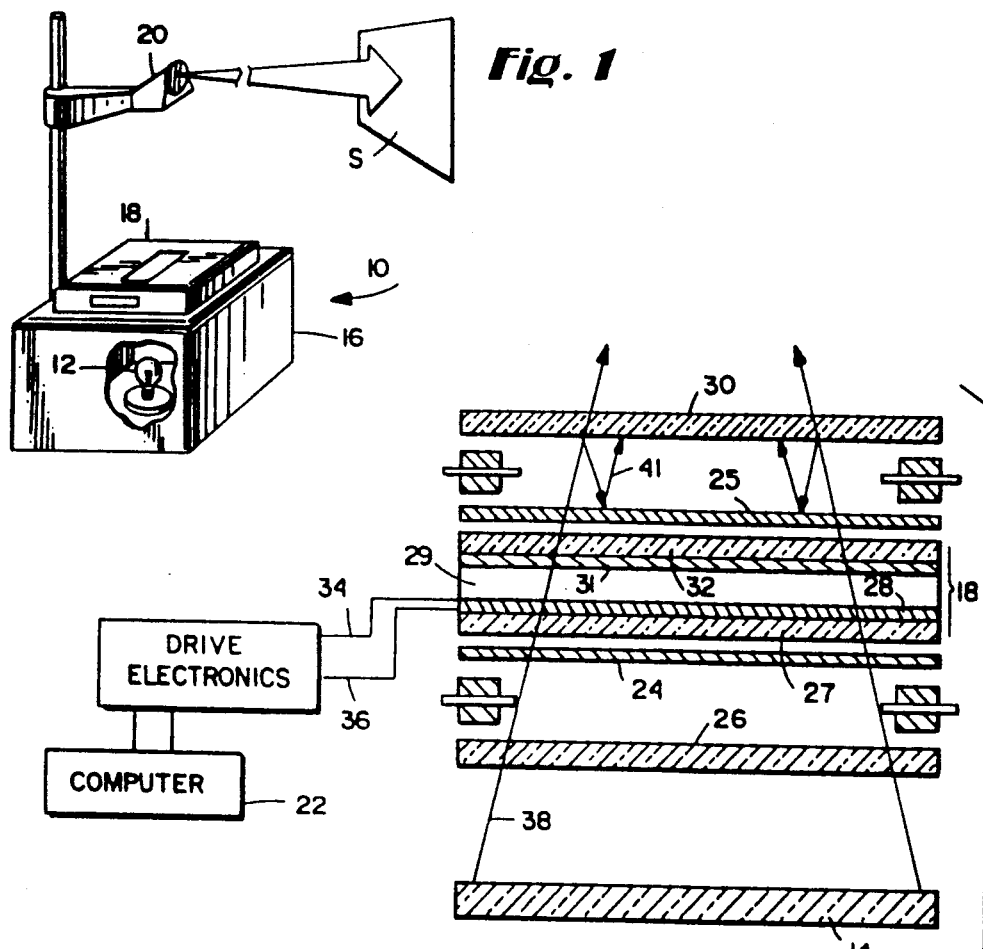
Fig. 1
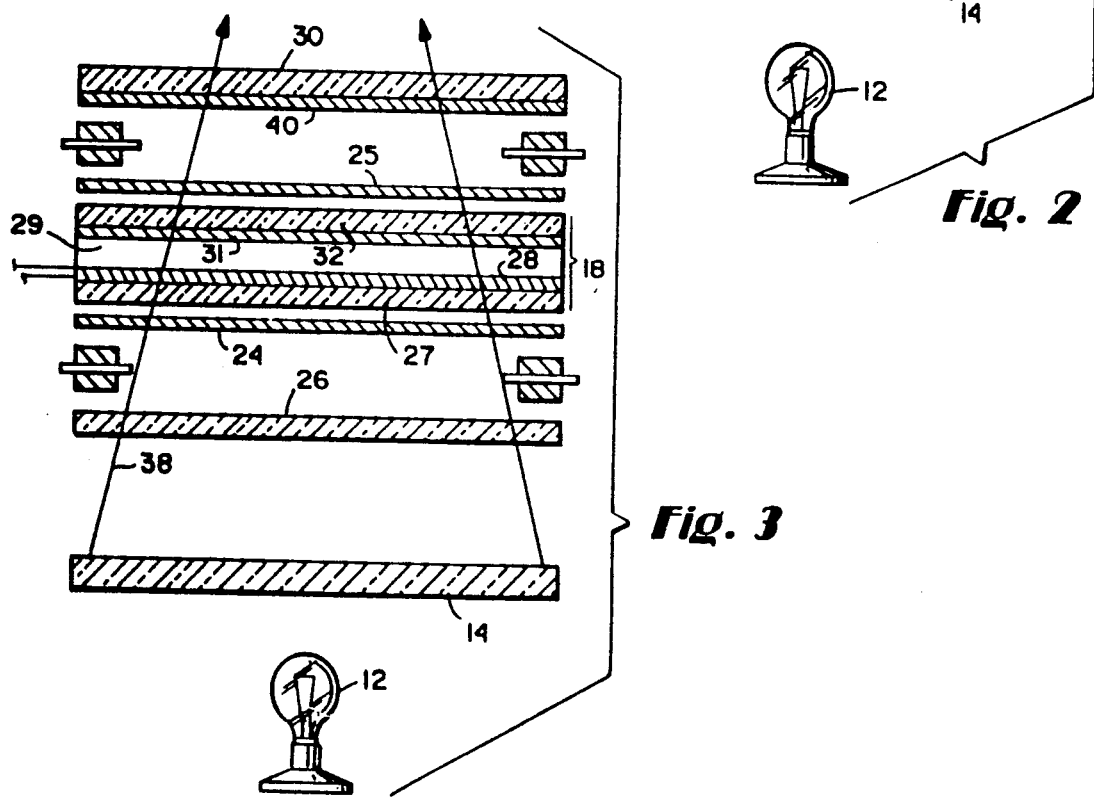
Fig. 2
Fig. 3

ACTIVE MATRIX LCD PROJECTION SYSTEM WITH ANTI-REFLECTIVE CHARACTERISTICS

BACKGROUND AND SUMMARY OF THE INVENTION

The present invention relates to a liquid crystal display (LCD) projection system and particularly relates to a projection system employing an active matrix LCD panel with sharp, high contrast ratios and minimum or non-existent secondary or ghost images on the display.

Optical projection systems, for example, overhead projectors, for displaying computer-generated images using liquid crystal displays are well known. See, for example, U.S. Pat. Nos. 4,154,007 and 4,763,993. In such systems, light from a light source passes through a focussing lens and through the liquid crystal display. Further optics associated with the projection system project the computer-generated image of the LCD display on an enlarged display surface. As well known, the optics of a standard liquid crystal display projection system include an LCD panel located between two protective light-transmissive glass panels. The glass panels are spaced from the LCD for protection purposes and also to provide spaces for flowing cooling air. Conventional LCD projection systems of this type typically use conventional uncoated glass panels in conjunction with a passive matrix LCD panel. As well known, passive matrix LCD panels have electronics which are typically multiplexed whereby each portion of the LCD is addressed for a fraction of the time for the entire field and is thus necessarily frequently readdressed. This type of energization of the crystals of the LCD not only provides a somewhat slow response time but, importantly, produces an image having a contrast ratio, projected or otherwise, which, while useful for certain purposes, is not as sharp or delineated as desired.

Typically, a passive matrix LCD panel in an LCD projection system is disposed and spaced between uncoated glass panels. Because passive matrix LCD panels have rather low contrast ratios, on the order of 10:1 and typically a maximum of about 20:1, reflections from optical components of the system are not noticeable and do not cause a problem in recognition of the generated images.

However, when using an LCD panel having a high contrast ratio, such as an active matrix LCD panel having light transmittance and contrast ratio characteristics much higher than passive matrix LCDs, the otherwise sharp, highly contrasted, and well-defined images typically have secondary or ghost images associated therewith. For example, when high contrast ratios on the order of 50:1 and greater, are obtained by using the active matrix LCD panels in the projection system, the image display has secondary reflections or ghosting images along the borders of the characters. Thus, where it has been attempted to employ an active matrix LCD panel in a projection system, the beneficial higher contrast ratios generated, as compared with those generated in passive matrix LCD panels, is degraded by these ghosting or secondary images within the system.

As well known, active matrix panels, for example, of the thin-film transistor type, maintain the signal charge within pixel electrodes. Thus, multiplexed transistors act as switches that allow the active matrix LCD to alternately block and pass light for extended periods corresponding to the scan time for the field, and therefore afford higher contrast ratios, for example, greater than 50:1 in comparison with contrast ratios of less than 20:1 for passive matrix displays.

According to the present invention, it has been discovered that the source of the secondary or ghost images, in an LCD projection system which employs an active matrix LCD panel, is light reflected from the optical components of the system and particularly reflected from the upper glass panel and back by the polarizer. It will be recalled that the optical path from the light source in a projection system of this type passes through a lens which focuses the light for transmission along an optical path non-perpendicular to a plane containing the LCD. More particularly, the light from the projector passes through the bottom glass panel, through the LCD panel and through the top glass panel at an angle other than 90° relative to the LCD and its protective glass panels. It has been discovered that light is reflected from the top glass panel back onto the LCD, and is then reflected again from the LCD back to and through the top glass panel and that it is this light which causes secondary or ghost images to occur about the image characters, thereby generally degrading the contrast ratio. Additional further reflections of the reflected light also occur, compounding the problem. Because the light passing through the LCD panel is angled relative thereto, the reflections occur a slight distance away from the original image, thus producing the secondary or ghosting images in the display. In short, the secondary or ghost images are the result of light angled by the focussing lens in the projection system before it enters the LCD panel whereby reflections in the optical components of the LCD are inherent.

Having discovered the source of the problem associated with secondary or ghosting images in a projection system using an active matrix LCD panel, the present invention solves that problem by providing an attenuation of the reflected light sufficient to minimize or eliminate these secondary or ghost images. To accomplish this, the reflections from the top glass back to the LCD panel are reduced or eliminated while maintaining transmissivity. The source of the problem lies in the employment of conventional uncoated glass, such as soda lime glass, which reflects a substantial amount of light from its surface, such glass being desirable in these systems, however, because of its high degree of light transmittance. When used with the active LCD matrix panel, however, the secondary reflections from such glass are unacceptable. Efforts to reduce or eliminate the reflected-back light from the glass by using conventional acid-edged anti-glare glass have not proved satisfactory because of decreased light transmittance of the optical system employing that glass. Such anti-glare glass also distorted the resulting image.

In order to solve the problem, a thin-film optical coating has been found which, when applied to conventional glass, such as soda lime glass, alters the reflective properties of the glass to eliminate, minimize or attenuate the reflected light sufficiently to avoid the formation of secondary or ghost images on the projected surface. Moreover, the particular coating has a property which enhances and beneficially increases the transmissivity of light through the glass. In LCD projection systems, light transmittance is very important to image quality and any increase in transmittance is beneficial in enhancing image quality. Thus, by applying a thin-film anti-reflective, high light transmittance coating along the underside of the overlying glass panel, for example, of a type known as a High-Efficiency Anti-Reflective (HEA) coating, manufactured by Optical Coating Laboratory, Inc., 2789 North Point Parkway, Santa Rosa, Calif., it has been found that the secondary or ghosting images resulting in projection systems using an active matrix LCD panel are substantially minimized, eliminated or attenuated.

In a preferred embodiment according to the present invention, there is provided apparatus for displaying images on a surface comprising a light source for projecting light along an optical path toward the surface, liquid crystal means disposed in the optical path, means for generating liquid crystal energizing signals and coupled to the liquid crystal means for selectively energizing portions thereof to define an image for projection on the surface, a glass panel spaced above the liquid crystal means and in the optical path and anti-reflective means disposed in the optical path adjacent the underside of the glass panel to substantially preclude light from being reflected back toward the liquid crystal means, thereby substantially precluding secondary reflections from interfering with the images displayed on the surface.

Accordingly, it is a primary object of the present invention to provide a novel and improved liquid crystal display projection system employing an active matrix LCD panel to produce sharp, undistorted images having high contrast ratios on the order of 50:1 and greater, without degradation of the quality of the image by light reflected in the optical components of the LCD.

These and further objects and advantages of the present invention will become more apparent upon reference to the following specification, appended claims and drawings.

BRIEF DESCRIPTION OF THE DRAWING FIGURES

FIG. 1 is a perspective view of an optical projection system employing an active matrix liquid crystal display panel in accordance with the present invention;

FIG. 2 is a schematic side elevational view illustrating an active matrix liquid crystal display panel in the optical path of a projection system in a manner illustrating the mechanism of the reflected light which creates the secondary or ghost images on the display surface; and FIG. 3 is a view similar to FIG. 2 illustrating the projection system according to the present invention.

DETAILED DESCRIPTION OF THE DRAWING FIGURES

Reference will now be made in detail to a present preferred embodiment of the invention, an example of which is illustrated in the accompanying drawings.

Referring now to the drawings, particularly to FIG. 1, there is illustrated a projection system according to the present invention, including an overhead projector, generally designated 10, having a light source 12 and a lens 14 (FIGS. 2 and 3) within a housing 16. An active matrix LCD panel 18 is disposed in the optical path between the light source 12 and a lens and mirror assembly, designated 20, which projects the image of the LCD panel onto a surface S. As will be appreciated by those skilled in this art, images are formed in the liquid crystal display panel by energizing and deenergizing each pixel under computer control, for example, by computer 22 (FIG. 2). Thus, liquid crystals, which may be of various types, for example, twisted nematic, smectic or colloidal, although twisted or super-twisted nematic crystals are preferred, are locally energized and deenergized to block and pass light.

In a preferred embodiment of the present invention employing thin-film transistor (TFT) LCD technology, multiplexed transistors act as switches that allow the LCD to alternately block and pass light. For example, in a typical TFT active matrix LCD, data lines are connected to column drivers which provide a display data signal and gate lines are connected to a scanning signal by row drivers arranged, respectively, in an X-Y metallization structure. Source and drain electrodes are connected with the data line and the pixel electrode is controlled by a gate electrode. When the transistors in the same row are turned on by the gate signal, display data is transferred to the pixel electrodes through the data lines and the associated transistor. After the data is transferred, the transistor is turned off by switching the gate line to a non-addressed state. The display data is thus stored at each pixel for substantially the entire field period until the next selection time. A typical TFT active matrix LCD of this type is described and illustrated in U.S. Pat. No. 4,591,848, the disclosure of which is incorporated herein by reference.

Referring now to FIG. 2, there is illustrated an active matrix LCD panel used in the projection system hereof which includes, along the optical path provided by the light source 12 and lens 14, a lower glass panel 26, a polarizer 24, the active matrix LCD panel 18, a polarizer 25 and an upper glass panel 30. The active matrix LCD panel 18 includes a lower glass layer 27, a TFT metallization layer 28 containing the thin-film transistors, the liquid crystal material 29, a common electrode 31, and an upper glass layer 32. The TFT layer is driven by gate and data drive signals 34 and 36, respectively, under control of the computer 22. The active matrix LCD panel may be of the type manufactured by Sharp, designated as Sharp LQ10P011 TFT LCD panel. As illustrated in FIG. 2, light from light source 12 passes through lens 14 and along an optical path defined by the arrows 38. Light path 38 is angled, i.e., non-perpendicular, relative to the plane of the LCD panel and ancillary components. Thus, the light rays 38 pass through lower glass panel 26, polarizer 24, LCD panel 18, polarizer 25, and upper glass panel 30. It will be appreciated that the glass panels 26 and 30 are spaced from the LCD panel 28 by spacing elements which also permit cooling air to enter the spaces between the LCD panel and the glass panels to maintain the unit cooled. It has been discovered that, with the employment of an active matrix LCD panel in conjunction with spaced glass panels, light rays are reflected from the upper glass panel 30 back onto the LCD, particularly polarizer 25, and then reflected again from the LCD back to and through the top glass piece. The reflected light also causes additional reflections. This reflected light is indicted by the arrows 41 in FIG. 2. Because of the angle of the light rays 38 passing through the LCD panel, these reflected light rays 41 pass through the upper glass panel a lateral distance spaced from the original image, as illustrated by a comparison of the arrows 38 and 41 in FIG. 2 at glass 30, thus producing a secondary or ghost image on the display surface S.

To eliminate those secondary or ghost images in accordance with the present invention, and with reference to FIG. 3, there is provided a thin-film coating 40 of high-efficiency, anti-reflective material which minimizes or eliminates the reflections back onto the LCD or attenuates such reflections to the extent that any extant secondary or ghost images do not significantly degrade the high contrast ratio images provided by the active matrix panel on the surface S. Such coating may be of the type manufactured by Optical Coating Laboratory, Inc., 2789 North Point Parkway, Santa Rosa, Calif., and identified as their HEA coating OCLI 6035001. The coating is applied to the underside of the upper glass panel 30.

By employing a coating of this type, which minimizes or eliminates the surface reflections without loss of image quality, it has also been found that such coating increases the transmissivity of the glass panel 30. In LCD projection systems of the type disclosed herein, light transmittance is very important to image quality and by using a coating which is not only anti-reflective, but also improves transmissivity, reflections are reduced while the quality of the image is enhanced. The coating has been found particularly useful and performs its intended purpose in those LCD panels providing a contrast ratio of 50:1 and above, e.g., most active matrix LCD panels.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Apparatus for displaying images on a surface comprising:

a light source for projecting light along an optical path toward the surface;

liquid crystal means disposed in said optical path;

means for generating liquid crystal energizing signals and coupled to said liquid crystal means for selectively energizing portions thereof to define an image for projection on the surface;

a glass panel spaced above said liquid crystal means and in said optical path; and anti-reflective means disposed in said optical path adjacent the underside of said glass panel to substantially preclude light from being reflected back toward said liquid crystal means, thereby substantially precluding secondary reflections from interfering with the images displayed on the surface.

2. Apparatus according to claim 1 wherein said liquid crystal is an active matrix LCD panel.

3. Apparatus according to claim 2 wherein said active matrix LCD panel comprises a thin-film transistor panel.

4. Apparatus according to claim 2 including a polarizer between said glass panel and said active matrix LCD panel.

5. Apparatus according to claim 1 wherein said liquid crystal means is of a type providing an image contrast ratio of greater than 50:1.

6. Apparatus according to claim 5 wherein said liquid crystal means is a active matrix LCD panel which comprises a thin-film transistor panel.

7. Apparatus according to claim 1 wherein said anti-reflective means comprises a thin-film coating along the undersurface of said glass panel in juxtaposition to the liquid crystal means.

8. Apparatus according to claim 7 including a polarizer overlying the liquid crystal means and spaced from the undersurface of said glass panel.

* * * * *